US009672789B2

(12) United States Patent
Hiramoto et al.

(10) Patent No.: US 9,672,789 B2
(45) Date of Patent: Jun. 6, 2017

(54) COLOR CONVERSION DEVICE, IMAGE FORMING DEVICE, AND COLOR CONVERSION METHOD

(71) Applicant: Konica Minolta, Inc., Chiyoda-ku, Tokyo (JP)

(72) Inventors: Kenichirou Hiramoto, Hachioji (JP); Toshiyuki Mizutani, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 53 days.

(21) Appl. No.: 14/431,065

(22) PCT Filed: Sep. 12, 2013

(86) PCT No.: PCT/JP2013/074608
§ 371 (c)(1),
(2) Date: Mar. 25, 2015

(87) PCT Pub. No.: WO2014/050576
PCT Pub. Date: Apr. 3, 2014

(65) Prior Publication Data
US 2015/0235611 A1 Aug. 20, 2015

(30) Foreign Application Priority Data
Sep. 27, 2012 (JP) .................................. 2012-213763

(51) Int. Cl.
*G09G 5/02* (2006.01)
*G09G 5/06* (2006.01)
(Continued)

(52) U.S. Cl.
CPC .................. *G09G 5/02* (2013.01); *G06K 9/52* (2013.01); *G06T 7/20* (2013.01)

(58) Field of Classification Search
CPC combination set(s) only.
See application file for complete search history.

(56) References Cited

U.S. PATENT DOCUMENTS

2002/0191104 A1* 12/2002 Matsutani .............. H04N 9/646
348/441
2003/0133607 A1   7/2003 Goto et al.
(Continued)

FOREIGN PATENT DOCUMENTS

CN        1984229 A      6/2007
JP     2003219191 A      7/2003
(Continued)

OTHER PUBLICATIONS

Extended European Search Report corresponding to Application No. 13841345.5-1903/2903252, PCT/JP2013/074608; Date of Mailing: Jun. 27, 2016.
(Continued)

Primary Examiner — Wesner Sajous
(74) Attorney, Agent, or Firm — Cantor Colburn LLP

(57) ABSTRACT

A color conversion device includes color conversion sections, an obtaining section and a reconversion section. The color conversion sections perform color conversion in parallel to convert colors of pixels contained in image data of a predetermined number of rows. The predetermined number is two or more. For the color conversion, at least one color conversion section uses certain color conversion information, and the other color conversion section uses other color conversion information having an information amount less than that of the certain color conversion information. The obtaining section obtains attribute information indicating an attribute of each of the pixels. When the attribute information is predetermined attribute information, the reconversion section converts a pixel color-converted with the other color conversion information using a pixel color-converted with the certain color conversion information in a predetermined pixel area contained in the image data.

10 Claims, 7 Drawing Sheets

(51) Int. Cl.
*G06T 7/20* (2006.01)
*G06T 11/00* (2006.01)
*H04N 1/60* (2006.01)
*H04N 9/69* (2006.01)
*G06K 9/52* (2006.01)

(56) References Cited

U.S. PATENT DOCUMENTS

| | | | |
|---|---|---|---|
| 2007/0139675 A1* | 6/2007 | Kawano | H04N 1/40062 358/1.9 |
| 2007/0188788 A1* | 8/2007 | Hayaishi | H04N 1/6027 358/1.9 |
| 2009/0027410 A1* | 1/2009 | Inuzuka | G09G 5/026 345/555 |
| 2010/0002104 A1* | 1/2010 | On | G06T 5/007 348/252 |
| 2010/0165137 A1* | 7/2010 | Koishi | G02B 21/365 348/222.1 |
| 2011/0255104 A1 | 10/2011 | Matsuhira | |
| 2012/0218574 A1* | 8/2012 | Fukuda | H04N 1/6097 358/1.9 |

FOREIGN PATENT DOCUMENTS

| | | |
|---|---|---|
| JP | 2005258650 A | 9/2005 |
| JP | 2007166560 A | 6/2007 |
| JP | 2012109884 A | 6/2012 |

OTHER PUBLICATIONS

PCT International Preliminary Report on Patentability and Written Opinion of the International Searching Authority for PCT Application No. PCT/JP2013/074608; Date of Issuance: Mar. 31, 2015, with English translation.

International Search Report corresponding to International Application No. PCT/JP2013/074608; Date of Mailing: Nov. 19, 2013, with English translation.

Chinese Office Action corresponding to Application No. 2013800449516.9; Date of Mailing: Nov. 2, 2016, with English translation.

* cited by examiner

FIG.8

| # | COMBINATION PATTERN OF ATTRIBUTE INFORMATION IN UNIT AREA | PIXEL TO BE SUBJECTED TO 16^4 COLOR CONVERSION | WHETHER TO PERFORM RECONVERSION | POSITIONS OF PIXELS TO BE THE SAME COLOR BY RECONVERSION (H) |
|---|---|---|---|---|
| P1 | I I / I I | m11 | YES | H H / H H |
| P2 | E I / I I | m12, m21 or m22 | YES | _ H / H H |
| P3 | I E / I I | m11, m21 or m22 | YES | H _ / H H |
| P4 | I I / E I | m11, m12 or m22 | YES | H H / _ H |
| P5 | I I / I E | m11, m12 or m21 | YES | H H / H _ |
| P6 | I E / E I | m11 or m22 | NO | |
| P7 | E I / I E | m12 or m21 | NO | |
| P8 | I E / I E | m11 or m21 | YES | H _ / H _ |
| P9 | E I / E I | m12 or m22 | YES | _ H / _ H |
| P10 | E E / I I | m21 or m22 | YES | H H |
| P11 | I I / E E | m11 or m12 | YES | H H |
| P12 | E E / E I | m22 | NO | |
| P13 | E E / I E | m21 | NO | |
| P14 | E I / E E | m12 | NO | |
| P15 | I E / E E | m11 | NO | |
| P16 | E E / E E | m11 | NO | |

COLOR CONVERSION DEVICE, IMAGE FORMING DEVICE, AND COLOR CONVERSION METHOD

This is the U.S. national stage of application No. PCT/JP2013/074608, filed on Sep. 12, 2013. Priority under 35 U.S.C. §119(a) and 35 U.S.C. §365(b) is claimed from Japanese Application No. 2012-213763, filed Sep. 27, 2012, the disclosure of which is also incorporated herein by reference.

TECHNICAL FIELD

The present invention relates to a color conversion device, an image forming device and a color conversion method.

BACKGROUND ART

There is known an image processing device for color conversion of images. The image processing device has all lookup tables (LUT) for color conversion provided for respective elements, such as a picture and a character, which require different types of color conversion, and performs color conversion using an LUT as color conversion information for an element which is a target of the color conversion (Patent Document 1, for example).

RELATED ART DOCUMENTS

Patent Documents

Patent Document 1: Japanese Patent Application Laid-Open Publication No. 2003-219191

SUMMARY OF THE INVENTION

Problems to be Solved by the Invention

By the way, in recent years, with increase of the speed of image formation performed by an image forming device, there has also been a demand for a higher speed of color conversion of images is performed in image formation.

As a general method for speeding up color conversion, there is a method of performing color conversion in parallel on pixels constituting an image with a plurality of color conversion devices which perform color conversion provided.

However, a conventional image processing device as described in Patent Document 1 requires a storage area to store a plurality of LUTs. When a plurality of image processing devices of this type are provided to perform processing in parallel, the image processing devices each have a plurality of LUTs and therefore requires a storage area having a massive data capacity (hereinafter simply referred to as a "capacity").

On the other hand, when data amounts of LUTs which one image processing device has are reduced in order to reduce the capacity, information amounts of the LUTs decrease, and therefore the accuracy of color conversion with the LUTs decreases; for example, color gradation after color conversion decreases.

An object of the present invention is to provide a color conversion device, an image forming device and a color conversion method each of which achieves both reduction in the capacity of a storage area to store color conversion information necessary for color conversion and higher-accuracy color conversion than the one with color conversion information having an information amount simply reduced.

Means for Solving the Problems

The invention of claim 1 is a color conversion device including: an input section which inputs image data of a predetermined number of rows, the predetermined number being two or more; a plurality of color conversion sections which perform color conversion in parallel to convert colors of pixels contained in the image data of the predetermined number of rows; an obtaining section which obtains attribute information set in each of the pixels constituting the image data of the predetermined number of rows, the attribute information indicating an attribute of each of the pixels; and a reconversion section which performs, on the basis of the attribute information, reconversion to reconvert a pixel contained in the image data of the predetermined number of rows color-converted by the color conversion sections, wherein each of the color conversion sections performs the color conversion using color conversion information including information on a correspondence between colors of pixels before color conversion and colors of the pixels after the color conversion, of the color conversion sections, at least one color conversion section performs the color conversion using certain color conversion information, and the other color conversion section performs the color conversion using other color conversion information having an information amount less than an information amount of the certain color conversion information, and when the attribute information is predetermined attribute information, the reconversion section converts, using a pixel color-converted with the certain color conversion information in a predetermined pixel area contained in the image data of the predetermined number of rows, a pixel color-converted with the other color conversion information in the predetermined pixel area.

The invention of claim 2 is the color conversion device according to claim 1, wherein the attribute information includes natural image information which indicates a pixel constituting a natural image, and when the attribute information including the natural image information is set as the predetermined attribute information in all the pixels contained in the predetermined pixel area, the reconversion section replaces, by the pixel color-converted with the certain color conversion information, the pixel color-converted with the other color conversion information.

The invention of claim 3 is the color conversion device according to claim 1 or 2 further including: an exchange section which exchanges pixels contained in the image data of the predetermined number of rows before the color conversion sections perform the color conversion; and a re-exchange section which re-exchanges the pixels having colors exchanged by the exchange section according to a correspondence between the pixels having the colors exchanged by the exchange section after the color conversion sections perform the color conversion but before the reconversion section performs the reconversion, wherein of the pixels exchanged by the exchange section, one pixel is color-converted with the certain color conversion information, and the other pixel is color-converted with the other color conversion information.

The invention of claim 4 is the color conversion device according to claim 3, wherein the exchange section determines the pixels to exchange on the basis of the attribute information on each of pixels contained in a unit area, the pixels being contained in the image data of the predetermined number of rows.

The invention of claim 5 is the color conversion device according to any one of claims 1 to 4, wherein the attribute information includes either edge information which indicates a pixel constituting an image contour or character information which indicates a pixel constituting a character image, and when the attribute information including the edge information or the character information is set in one or more pixels contained in the predetermined pixel area, the reconversion section does not perform the reconversion on the predetermined pixel area.

The invention of claim 6 is the color conversion device according to claim 5, wherein the attribute information includes: at least one of the edge information, which indicates a pixel constituting an image contour, and the character information, which indicates a pixel constituting a character image; and natural image information which indicates a pixel constituting a natural image, and when a positional relationship of a pixel where the attribute information including the edge information or the character information is set and a pixel where the attribute information including the natural image information is set in the unit area is a specific positional relationship, the reconversion section performs the reconversion on the predetermined pixel area even when the attribute information including the edge information or the character information is set in one or more pixels contained in the predetermined pixel area.

The invention of claim 7 is the color conversion device according to any one of claims 1 to 6, wherein the other color conversion information is a portion of the correspondence between colors of pixels before color conversion and colors of the pixels after the color conversion, the correspondence being contained in the certain color conversion information.

The invention of claim 8 is the color conversion device according to any one of claims 1 to 7, wherein the color conversion sections perform the color conversion in parallel on rows to convert the colors of the pixels contained in the rows of the image data of the predetermined number of rows.

The invention of claim 9 is an image forming device including: an image obtaining section which obtains image data of the predetermined number or more of rows; the color conversion device according to any one of claims 1 to 8 which converts colors of pixels contained in the image data obtained by the image obtaining section; and an image forming section which forms an image on the basis of the image data constituted of the pixels having the colors converted by the color conversion device.

The invention of claim 10 is a color conversion method of a color conversion device including: an input step of inputting image data of a predetermined number of rows, the predetermined number being two or more; a color conversion step of performing color conversion in parallel to convert colors of pixels contained in the image data of the predetermined number of rows; an obtaining step of obtaining attribute information set in each of the pixels constituting the image data of the predetermined number of rows, the attribute information indicating an attribute of each of the pixels; and a reconversion step of performing, on the basis of the attribute information, reconversion to reconvert a pixel contained in the image data of the predetermined number of rows color-converted by the color conversion sections, wherein in the color conversion step, the color conversion is performed using color conversion information including information on a correspondence between colors of pixels before color conversion and colors of the pixels after the color conversion, of the color conversion performed in parallel in the color conversion step, at least one color conversion is performed using certain color conversion information, and the other color conversion is performed using other color conversion information having an information amount less than an information amount of the certain color conversion information, and in the reconversion step, when the attribute information is predetermined attribute information, using a pixel color-converted with the certain color conversion information in a predetermined pixel area contained in the image data of the predetermined number of rows, a pixel color-converted with the other color conversion information in the predetermined pixel area is converted.

Advantageous Effects of the Invention

The present invention can achieve both reduction in the capacity of a storage area to store color conversion information necessary for color conversion and higher-accuracy color conversion than the one with color conversion information having an information amount simply reduced.

BRIEF DESCRIPTION OF DRAWINGS

FIG. 8 shows examples of a correspondence between a combination pattern of types of attribute information set in pixels contained in a unit area, a pixel in the unit area as a target of exchange by a pixel exchange unit, whether to perform reconversion by a reconversion unit, and positions of pixels to be the same color by reconversion, in the case where a pixel area containing image data of two rows to be color-converted by two color converting units which perform color conversion using the second color conversion table is the unit area.

EMBODIMENT FOR CARRYING OUT THE INVENTION

Hereinafter, embodiments of the present invention are described with reference to the drawings. Although various limitations technically preferable for carrying out the present invention are given to the embodiments below, the scope of the present invention is not limited to the embodiments or illustrated examples.

(First Embodiment)

Figure 1:
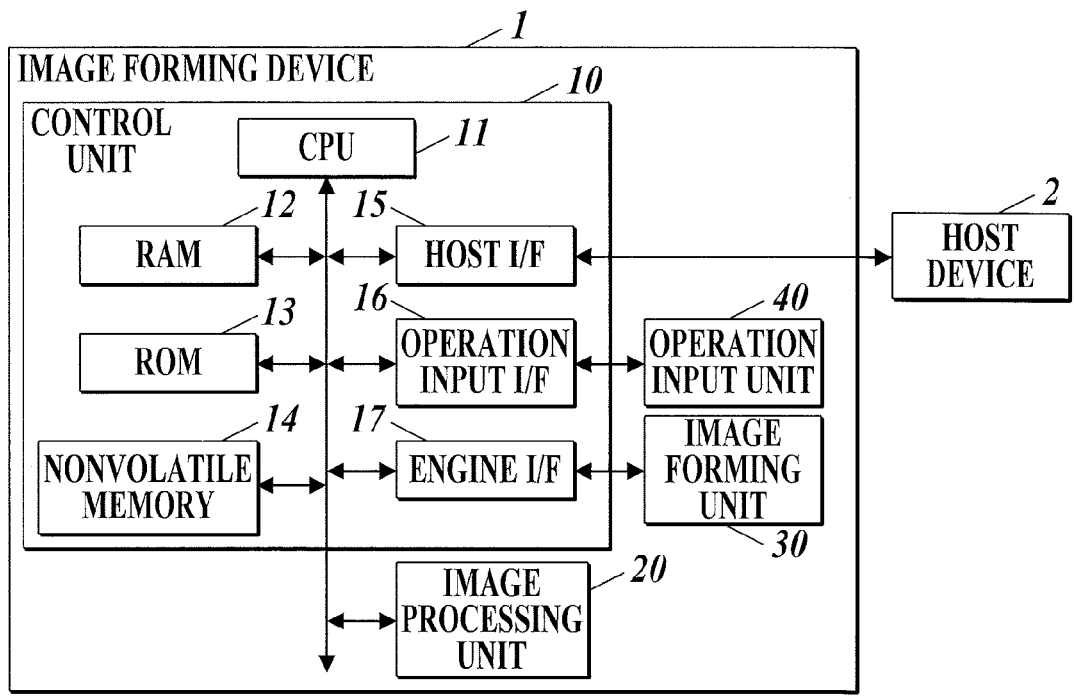
FIG. 1 is a block diagram showing the main components of an image forming device as a first embodiment of the present invention.

FIG. 1 is a block diagram showing the main components of an image forming device 1 as a first embodiment of the present invention.

The image forming device 1 includes a control unit 10, an image processing unit 20, an image forming unit 30 and an operation input unit 40.

The image forming device 1 obtains image data input from a host device 2 such as a personal computer (PC). The image forming device 1 performs image processing on the obtained image data with the image processing unit 20. Then, the image forming device 1 forms images on recording media with the image forming unit 30 on the basis of the image processing-performed image data.

The control unit 10 includes a CPU 11, a RAM 12, a ROM 13 and a nonvolatile memory 14. The CPU 11 of the control unit 10 reads various software programs and data from the ROM 13 or the nonvolatile memory 14 according to contents of processing and executes the read programs, thereby performing various types of processing relevant to the action of the image forming device 1.

The control unit 10 also includes various interfaces (I/F). More specifically, the control unit 10 includes: a host I/F 15 to connect the image forming device 1 to the host device 2; an operation input I/F 16 to connect the control unit 10 to the operation input unit 40; and an engine I/F 17 to connect the control unit 10 to the image forming unit 30. The control unit 10 obtains image data, for example, from the host device 2 connected thereto through the host I/F 15, thereby functioning as an image obtaining section.

The image processing unit 20 performs various types of image processing on the image data input into the image forming device 1.

Figure 2:
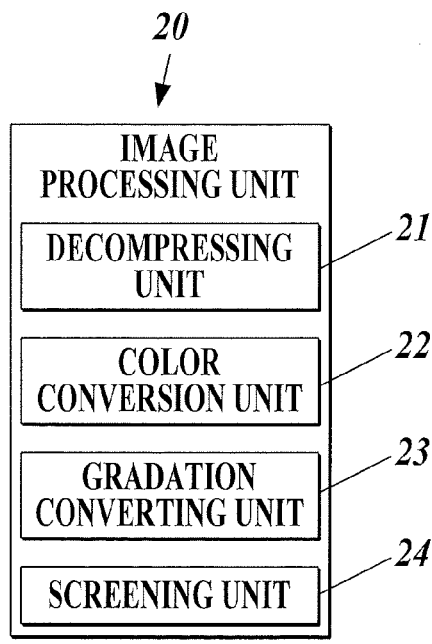
FIG. 2 is a block diagram showing the main components of an image processing unit.

More specifically, the image processing unit 20 includes, for example, as shown in FIG. 2, a decompressing unit 21, a color conversion unit 22, a gradation converting unit 23 and a screening unit 24. The image processing unit 20 is constituted of, for example, integrated circuits such as FPGA (Field-Programmable Gate Array) and ASIC (Application Specific Integrated Circuit). Functions of the units of the image processing unit 20 are functions implemented on the integrated circuits.

The decompressing unit 21 decompresses compressed image data (e.g., CMYK image data).

The color conversion unit 22 converts colors of pixels contained in the image data decompressed by the decompressing unit 21. The processing performed by the color conversion unit 22 is detailed below.

The gradation converting unit 23 performs predetermined gradation conversion on individual colors (e.g., cyan (C), magenta (M), yellow (Y) and black (K)) contained in the image data color-converted by the color conversion unit 22. Examples of the predetermined gradation conversion include monochrome bitmap conversion and grayscale conversion.

The screening unit 24 performs predetermined screening on the image data gradation-converted by the gradation converting unit 23. Examples of the predetermined screening include error diffusion, AM screening and FM screening (stochastic screening).

The image forming unit 30 forms images on recording media on the basis of the image data subjected to the image processing by the image processing unit 20. That is, the image forming unit 30 functions as an image forming section which forms images on the basis of the image data constituted of the pixels having the colors converted by the color conversion unit 22.

More specifically, the image forming unit 30 includes: a conveyance unit which takes out and conveys paper from a paper tray in which the paper is stored as recording media; a head unit having nozzles which discharge inks to the paper being conveyed by the conveyance unit; a drive unit which drives the head unit according to the image data; an ejection unit which ejects the paper with images formed thereon; a supply unit which supplies inks to the head unit; and a cleaning unit which cleans the nozzles of the head unit, all of which are not shown.

The operation input unit 40 makes various inputs relevant to the action of the image forming device 1 in response to user operations.

More specifically, the operation input unit 40 includes: a touch-panel input display device; an up/down/right/left movement key to select data, perform scrolling operations, and so forth; and various function keys, and outputs press signals of keys pressed by a user and/or operation signals of a mouse operated thereby to the CPU 11 of the control unit 10.

Next, the processing performed by the color conversion unit 22 of the image processing unit 20 is described.

Figure 3:
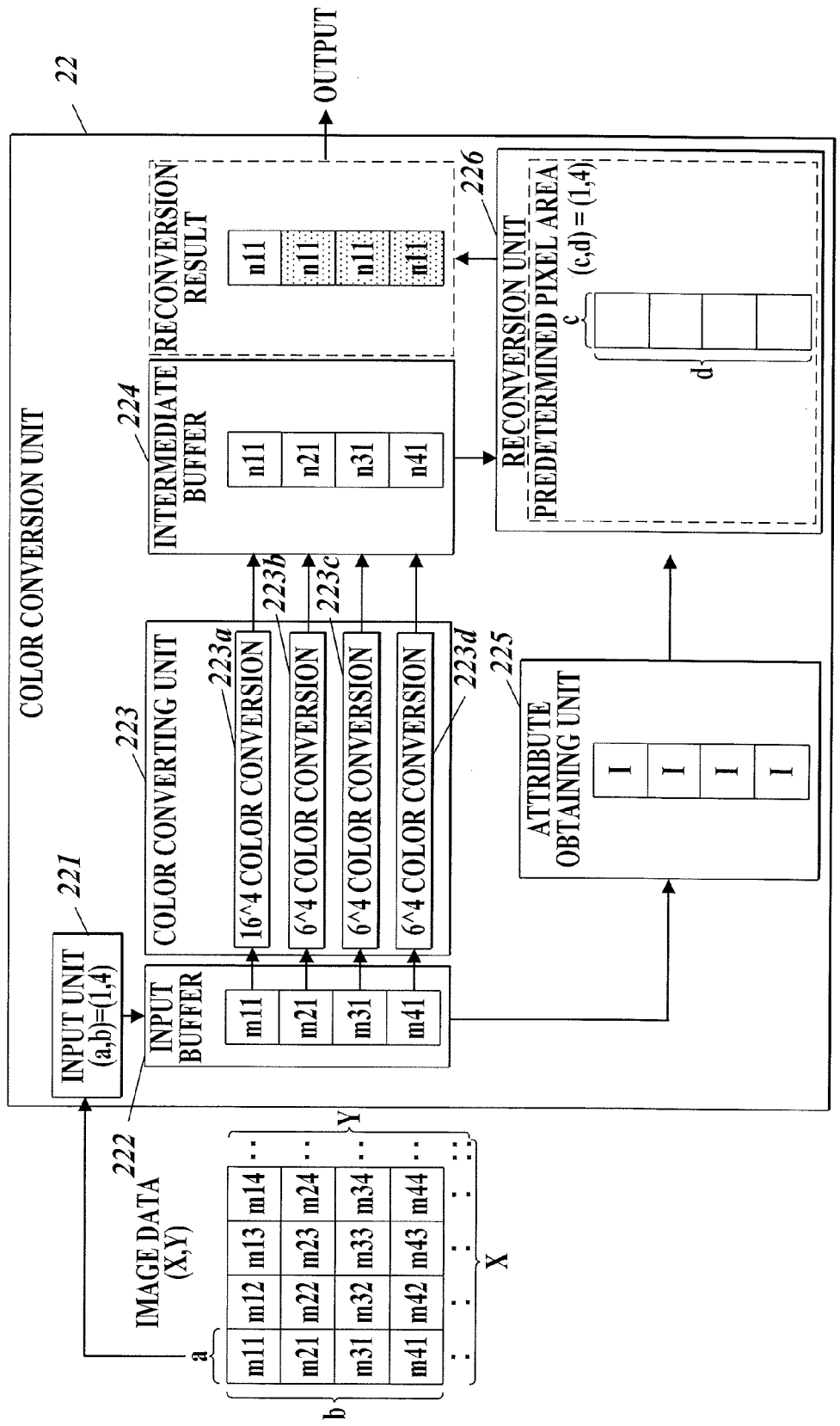
FIG. 3 is an image figure showing the flow of processing performed by a color conversion unit of the first embodiment.

FIG. 3 is an image figure showing the flow of the processing performed by the color conversion unit 22 of the first embodiment.

The color conversion unit 22 includes an input unit 221, an input buffer 222, a color converting unit 223, an intermediate buffer 224, an attribute obtaining unit 225 and a reconversion unit 226.

The input unit 221 functions as an input section which inputs image data of a predetermined number of rows, the predetermined number being two or more.

More specifically, the input unit 221 successively extracts image data, for example, from a pixel area of X pixels×Y pixels which constitute the image data decompressed by the decompressing unit 21 in units of a pixel area of a pixels×b pixels and writes the extracted image data into the input buffer 222, wherein X≥a and Y≥b.

In the pixel area of X pixels×Y pixels, a direction along the X direction is a row direction, and a direction along the Y direction is a column direction. That is, the input unit 221 extracts image data of a pieces arranged in the X direction for b rows and writes the extracted image data into the input buffer 222. In the first embodiment, (a, b)=(1, 4). However, this is not a limitation but an example.

In FIG. 3, the position of each pixel in the pixel area of X pixels×Y pixels is shown as "m(y) (x)". For example, the pixel "m11" is a pixel which is the first (y=1) in the Y direction from the top and the first (x=1) in the X direction from the left.

The color converting unit 223 converts colors of pixels contained in the image data corresponding to the pixel area of a pixels×b pixels written into the input buffer 222.

More specifically, the color converting unit 223 is constituted of a plurality of color converting units provided for respective rows (b) of the image data input by the input unit 221. In the first embodiment, b=4. Hence, the color converting unit 223 has four color converting units 223a, 223b, 223c and 223d provided for the respective rows of the image data of four rows. These four color converting units 223a, 223b, 223c and 223d function as a plurality of color conversion sections which perform color conversion in parallel on rows to convert colors of pixels contained in the respective rows of the image data.

The color converting unit 223 writes the color-converted image data into the intermediate buffer 224.

In FIG. 3, a pixel obtained by color conversion on the pixel "m(y) (x)" is shown as "n(y) (x)".

The color conversion sections perform color conversion using color conversion information containing information on a correspondence between colors of pixels before color conversion and colors of the pixels after the color conversion.

More specifically, the four color converting units 223a, 223b, 223c and 223d perform color conversion using color conversion tables. Each color conversion table is data to correlate colors of pixels before color conversion (first values) with colors of the pixels after the color conversion (second values). The color conversion table contains, for example, information (hereinafter "pattern information") indicating the correspondence between first values and second values with respect to, of all the colors which the pixels before color conversion may have, some colors extracted by sampling. Each of the four color converting units 223a, 223b, 223c and 223d calculates second values respectively corresponding to first values by predetermined interpolation on the basis of the pattern information contained in the color conversion table. Then, each of the four color converting units 223a, 223b, 223c and 223d obtains, on the basis of the calculation result, second values respectively corresponding to first values written into the input buffer 222.

Of the color conversion sections, at least one color conversion section performs color conversion using certain color conversion information, and the other color conversion section(s) perform color conversion using other color conversion information which is different from the certain color conversion information.

Figure 4:
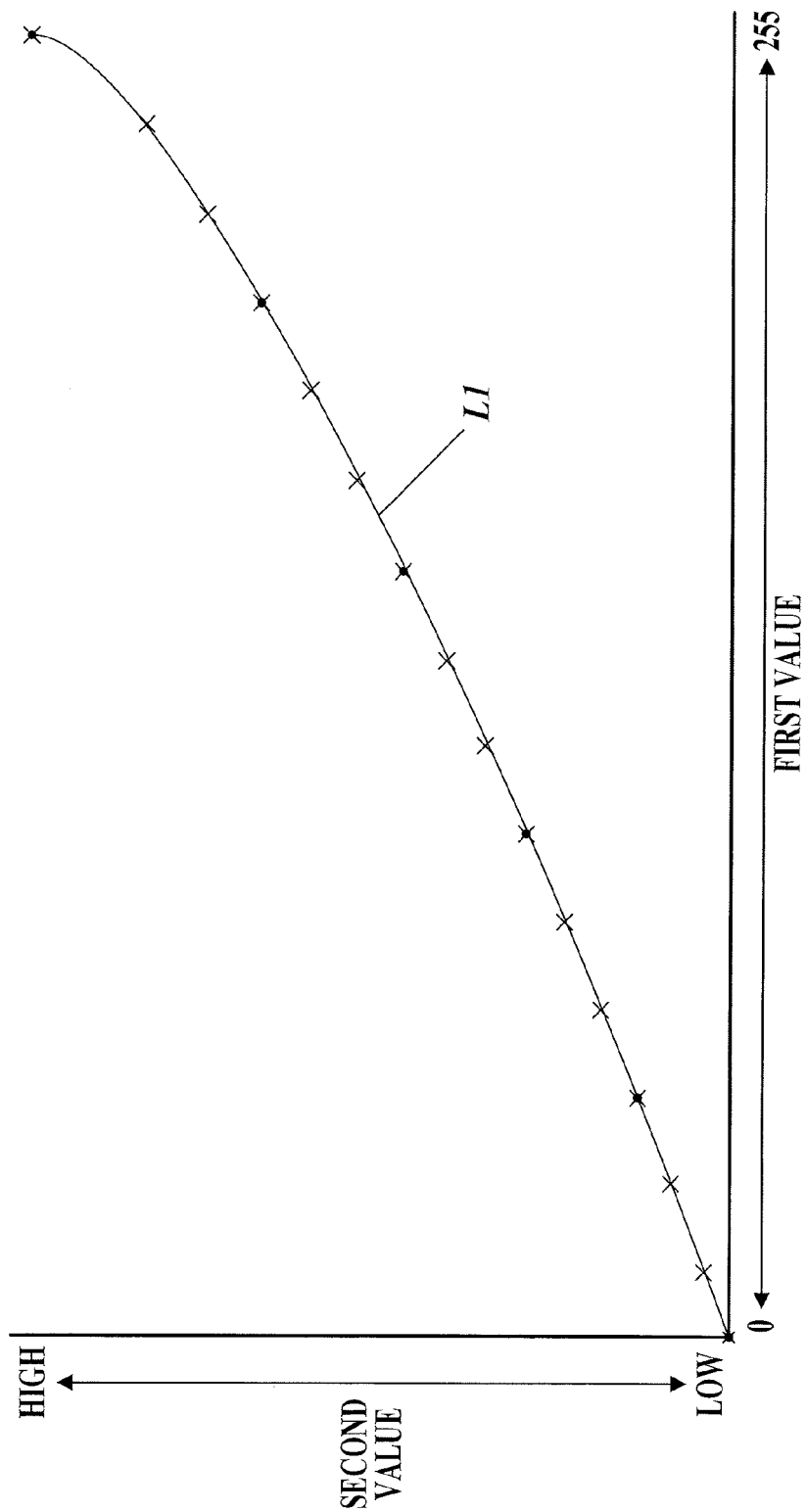
FIG. 4 is a schematic view of pattern information contained in a first color conversion table and a second color conversion table.

For example, as shown by the number of marks "x" put on a line L1 in FIG. 4, the number of pieces of pattern information (the number of partitions) on each color contained in the color conversion table (a first color conversion table) used by the color converting unit 223a is 16, and as shown by the number of black points put on the line L1, the number of partitions on each color contained in the color conversion table (a second color conversion table) used by the color converting units 223b, 223c and 223d is 6.

As shown by the line L1, the pattern information contained in the first color conversion table and the pattern information contained in the second color conversion table are pattern information contained in the same color conversion pattern. For example, the first color conversion table contains the pattern information for first values of 0, 17, 34, 51, 68, 85, 102, 119, 136, 153, 170, 187, 204, 221, 238 and 255 with respect to each color, whereas the second color conversion table contains the pattern information for first values of 0, 51, 102, 153, 204 and 255 with respect to each color. That is, the other color conversion information (the second color conversion table) is a portion of the correspondence between colors of pixels before color conversion and colors of the pixels after the color conversion contained in the certain color conversion information (the first color conversion table). Conversely, the first color conversion table contains the entire correspondence between first values and second values contained in the second color conversion table. The number of gradations of colors in color conversion with a color conversion table corresponds to the number of pieces of pattern information. Therefore, the first color conversion table has an information amount (the number of gradations of colors of pixels after color conversion represented by second values) more than that of the second color conversion table. Conversely, the second color conversion table has an information amount less than that of the first color conversion table.

Although FIG. 4 schematically shows the pattern information on one predetermined color represented by 8 bits (0 to 255), the actual color conversion table is an LUT having an information amount according to a combination of pieces of pattern information on a plurality of colors (e.g., cyan (C), magenta (M), yellow (Y) and black (K)). The information amount of a color conversion table is proportional to the number of partitions (e.g., 16 or 6) on each color and the number of colors (e.g., four colors of C, M, Y and K). For example, in the case where color conversion tables are for four colors of cyan (C), magenta (M), yellow (Y) and black (K), the first color conversion table contains an information amount equivalent to 16 to the power of 4 (16^4=65,536 patterns), and the second color conversion table contains an information amount equivalent to 6 to the power of 4 (6^4=1,296 patterns). In FIG. 3, on the color converting unit 223a which performs color conversion using the first color conversion table containing an information amount equivalent to 16 to the power of 4, the "16^4 color conversion" is put, and on the color converting units 223b, 223c and 223d which perform color conversion using the second color conversion table containing an information amount equivalent to 6 to the power of 4, the "6^4 color conversion" is put.

In the first embodiment, the data size of one piece of pattern information is 4 bytes for four colors with 1 byte for each color. Hence, the data size D1 of the first color conversion table is represented by the following equation (1), and the data size D2 of the second color conversion table is represented by the following equation (2).

$$D1=4\ bytes \times 16^4=262,144\ bytes \quad (1)$$

$$D2=4\ bytes \times 6^4=5,184\ bytes \quad (2)$$

The attribute obtaining unit 225 functions as an obtaining section which obtains attribute information set in each of the pixels which constitute the image data of the predetermined number of rows.

More specifically, the attribute obtaining unit 225 reads and obtains attribute information set in each of the pixels which constitute the image data corresponding to the pixel area of a pixels×b pixels written into the input buffer 222.

Herein, the attribute information obtained by the attribute information obtaining unit 225 is described.

The attribute information is information set in each of the pixels and indicates what image (e.g., a natural image such as a picture, a character in a font or the like, or a contour which is a boundary of these) the pixel constitutes in the image data. More specifically, the attribute information is set in each of the pixels as information indicating that the pixel is either for an "edge (E)" or for an "image (I)". The attribute information of the "edge (E)" is attribute information which indicates a pixel constituting the contour of an image, and is set in a pixel having a predetermined difference or more in color value from any of its adjacent pixels. The attribute information of the "image (I)" is attribute information which indicates a pixel constituting a natural image and is set in a pixel having the predetermined difference or more in color value from none of its adjacent pixels.

FIG. 3 shows, as an example, that the attribute information of the "image (I)" is set in all the pixels (m11, m21, m31, m41) contained in the pixel area of (a, b)=(1, 4) written into the input buffer 222.

The reconversion unit 226 functions as a reconversion section which reconverts the pixels contained in the image data of the predetermined number of rows color-converted by the color conversion sections (e.g., the four color converting units 223a, 223b, 223c and 223d) when the attribute information obtained by the attribute obtaining unit 225 is predetermined attribute information.

More specifically, for example, when the attribute information of the "image (I)" is set in all the pixels contained in a predetermined pixel area (a pixel area of c pixels×d pixels), the reconversion unit 226 replaces, of the pixels contained in the predetermined pixel area, the pixels color-converted with the second color conversion table by the pixel color-converted with the first color conversion table in the predetermined pixel area.

In the case shown in FIG. 3, the attribute information of the "image (I)" is set in all the four pixels (m11, m21, m31, m41) contained in the pixel area of (c, d)=(1, 4). In this case, the reconversion unit 226 performs replacement to replace the pixels (n21, n31, n41) color-converted with the second color conversion table by the pixel (n11) color-converted by the color converting unit 223a using the first color conversion table. Thus, through reconversion by the reconversion unit 226, the colors of all the four pixels (m11, m21, m31, m41) become the color of the pixel (n11) color-converted with the first color conversion table. A pixel where the attribute information of the "image (I)" is set is more gradual in color change from its surrounding pixel(s) than a pixel which constitutes an image contour or a character image, whereas gradation is important for the pixel. Hence, the pixel is replaced by the value of its neighboring pixel subjected to gradation-focused color conversion (e.g., color conversion with the first color conversion table).

Thus, on the basis of the pixel color-converted with the certain color conversion information (e.g., the first color conversion table) in the predetermined pixel area (e.g., the pixel area of c pixels×d pixels) contained in the image data of the predetermined number of rows (e.g., the image data corresponding to the pixel area of a pixels×b pixels), the reconversion unit 226 converts the pixels color-converted with the other color conversion information (e.g., the second color conversion table) in the predetermined pixel area.

On the other hand, when the attribute information of the "edge (E)" is set in one or more pixels contained in the predetermined pixel area (e.g., the pixel area of c pixels×d pixels), the reconversion unit 226 does not perform reconversion on the predetermined pixel area.

Figure 5:
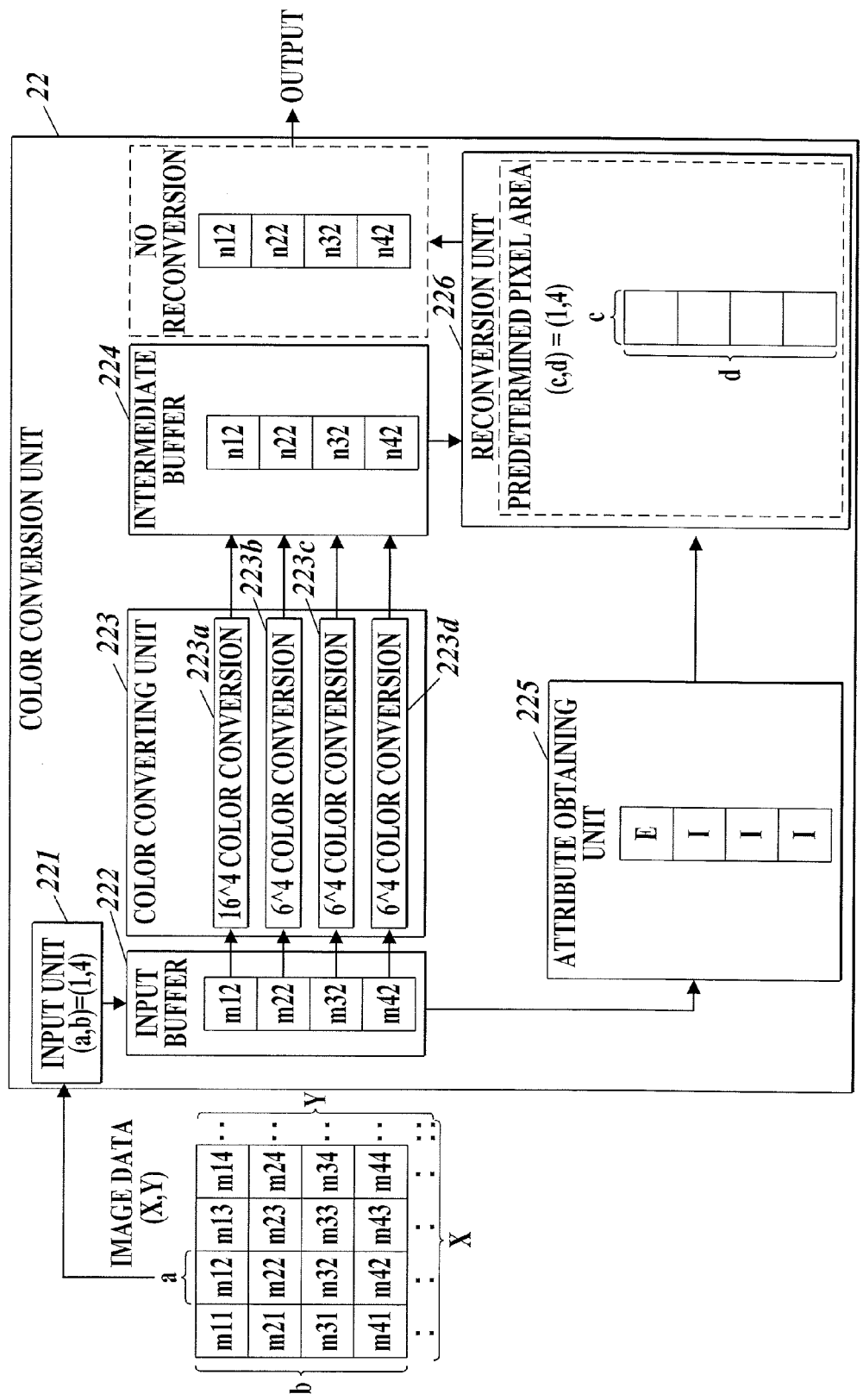
FIG. 5 is an image figure showing an example of the case where reconversion is not performed in the processing performed by the color conversion unit of the first embodiment.

In the case shown in FIG. 5, the attribute information of the "edge (E)" is set in one pixel (m12) of the four pixels (m12, m22, m32, m42) contained in the pixel area of (c, d)=(1, 4). In this case, the reconversion unit 226 does not perform reconversion on the pixel area. Therefore, the colors of the four pixels (m12, m22, m32, m42) are the colors of the pixels (n12, n22, n32, n42) respectively color-converted by the four color converting units 223a, 223b, 223c and 223d.

When performing reconversion, the reconversion unit 226 outputs image data corresponding to the reconverted pixel area of a pixels×b pixels to the gradation converting unit 23. On the other hand, when not performing reconversion, the reconversion unit 226 outputs image data corresponding to the pixel area of a pixels×b pixels written into the intermediate buffer 224 as it is to the gradation converting unit 23.

As described above, according to the image forming device 1 of the first embodiment, when the attribute information on pixels obtained by the attribute obtaining unit 225 is the natural image information, the reconversion unit 226 converts, using the pixel color-converted with the certain conversion information (e.g., the first color conversion table) in the predetermined pixel area contained in the image data of the predetermined number of rows, the pixels color-converted with the other conversion information (e.g., the second color conversion table) in the predetermined pixel area. Consequently, the pixel color-converted with the certain color conversion information is applicable to the pixels color-converted by the color conversion sections not using the certain color conversion information. Therefore, the difference between the color conversion results generated by the different color conversion information amounts used for color conversion can be eliminated by reconversion by the reconversion section. That is, without storing multiple types of color conversion information (e.g., a plurality of LUTs for color conversion) in each of the color conversion sections, on the basis of the color of the pixel obtained by color conversion with the certain color conversion information stored in any of the color conversion sections, the pixels contained in the image data of the predetermined number of rows can be reconverted. Therefore, it is unnecessary for each of the color conversion sections to have the certain color conversion information, and accordingly, as compared with the case where each of the color conversion sections has the certain color conversion information, the capacity to store color conversion information can be reduced. Further, the pixels contained in the image data of the predetermined number of rows can be color-converted with the accuracy of color conversion, the accuracy being obtained with the certain color conversion information. Thus, the image forming device 1 of the first embodiment can achieve both reduction in the capacity of the storage area to store color conversion information necessary for color conversion and that accuracy of color conversion.

For example, in the first embodiment, the total of the data sizes of the color conversion tables, which are represented by the equations (1) and (2), is D1+3×D2=277,696 bytes. If each of the four color converting units 223a, 223b, 223c and 223d has the first color conversion table, the total of the data sizes is 1,048,576 bytes. That is, the data size of the color conversion tables which the color conversion unit 22 of the first embodiment has is about 26% as compared with the case where it is designed that each of the four color converting units 223a, 223b, 223c and 223d uses the first color conversion table, so that the capacity required to store color conversion tables is reduced. Meanwhile, the image forming device 1 of the first embodiment can ensure gradation of colors of the pixels contained in the rows of the image data to be color-converted by the color converting units 223b, 223c and 223d not using the first color conversion table too by reconversion by the reconversion unit 226. Therefore, the image forming device 1 of the first embodiment can achieve both reduction in the capacity of the storage area to store color conversion information necessary for color conversion and the accuracy of color conversion.

Further, when the attribute information including the natural image information (e.g., the attribute information of the "image (I)") is set in all the pixels contained in the predetermined pixel area (the pixel area of c pixels×d pixels), the reconversion unit 226 replaces, by the pixel color-converted with the certain color conversion information (e.g., the first color conversion table) having a larger information amount, the pixels color-converted with the other color conversion information (e.g., the second color conversion table) which is different from the certain color conversion information. Consequently, to all the pixels in the predetermined pixel area, the result of color conversion with the certain color conversion information, by which the result of color conversion with a larger number of gradations is obtained, is applicable. Hence, without storing the certain color conversion information in each of the color conversion sections, the pixels of the rows respectively color-converted by the color conversion sections can be reconverted on the basis of the result of color conversion with a larger number of gradations. Therefore, both reduction in the capacity of the storage area to store color conversion information necessary for color conversion and the accuracy of color conversion can be achieved.

Further, when the attribute information including the edge information (e.g., the attribute information of the "edge (E)") is set in one or more pixels contained in the predetermined pixel area, the reconversion unit 226 does not perform reconversion on the predetermined pixel area. Consequently, the color (s) of the pixel (s) which constitutes an image contour can be maintained. It is more important for the pixel which constitutes an image contour to have a clear difference in color from its adjacent pixel (s) where another type of the attribute information is set, and therefore for the pixel, resolution is more important than gradation. Hence, when the pixel where the attribute information including the edge information is set is contained in the predetermined pixel area, reconversion is not performed on the predetermined pixel area, so that the difference in color between the pixel where the edge information is set and the above-described pixel adjacent to the pixel can be maintained, and the accuracy of color conversion can be ensured for the pixel area containing the pixel which constitutes an image contour.

Further, the other color conversion information (the second color conversion table) is a portion of the correspondence between colors of pixels before color conversion and colors of the pixels after the color conversion, the correspondence being contained in the certain color conversion information (the first color conversion table). Hence, the other color conversion information can be obtained by thinning out a portion of the correspondence between colors of pixels before color conversion and colors of the pixels after the color conversion contained in the certain color conversion information. Therefore, multiple types of color conversion information can be created by preparing only the correspondence between colors of pixels before color conversion and colors of the pixels after the color conversion necessary for the certain color conversion information, and accordingly time and effort for creation of color conversion information can be reduced.

Second Embodiment

Next, a second embodiment of the present invention is described. The image forming device of the second embodiment is the same as the image forming device 1 of the first embodiment in configuration, except for details of color conversion performed by the color conversion unit 22. Hence, other than the color conversion unit 22, descriptions are omitted. In addition, in the descriptions of the color conversion unit 22 of the second embodiment, the components the same as those in the first embodiment are given the same reference numbers as those in the first embodiment and their descriptions are omitted.

Figure 6:
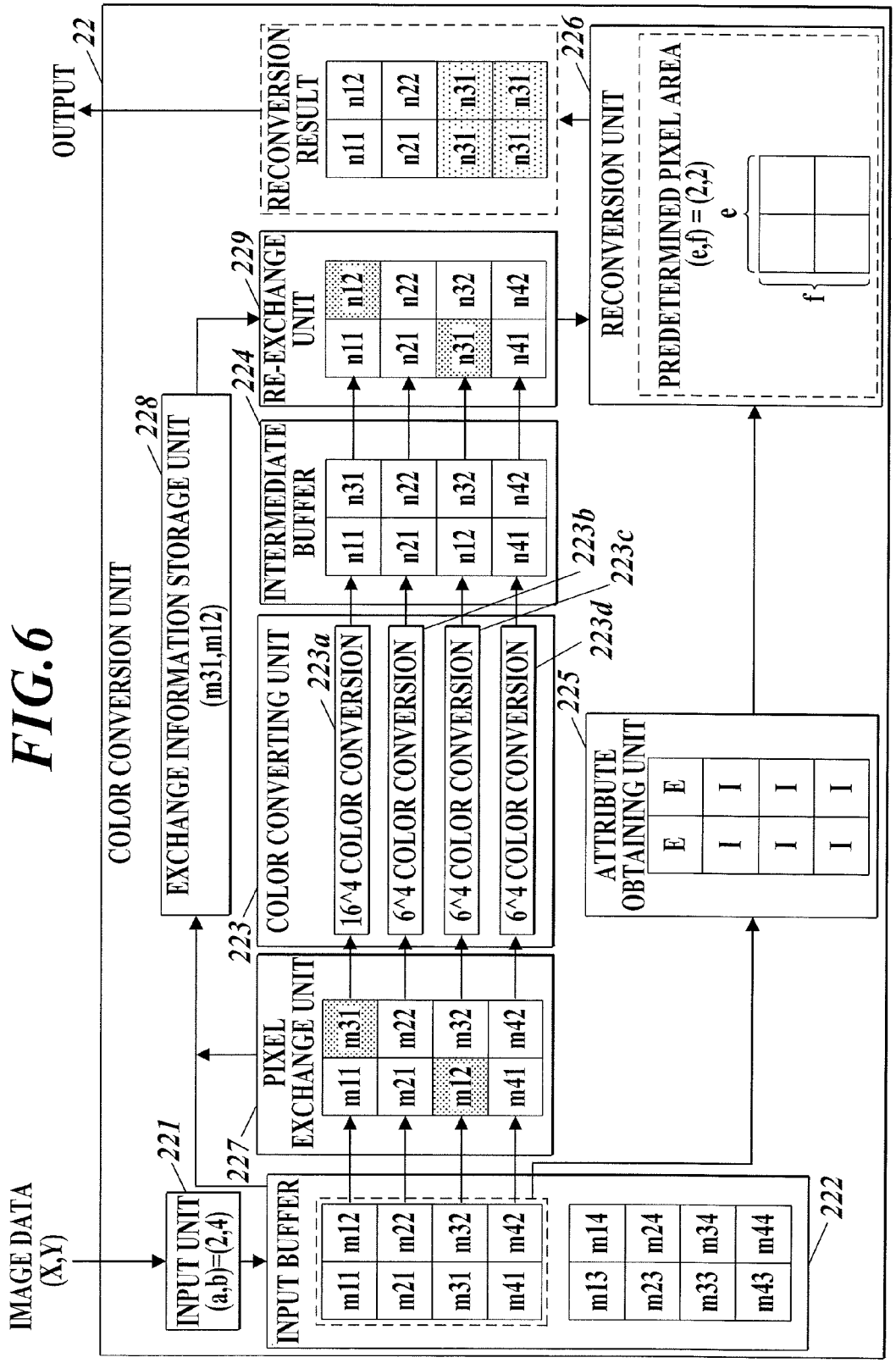
FIG. 6 is an image figure showing the flow of processing performed by a color conversion unit of a second embodiment.

FIG. 6 is an image figure showing the flow of processing performed by the color conversion unit 22 of the second embodiment.

The color conversion unit 22 of the second embodiment includes a pixel exchange unit 227, an exchange information storage unit 228 and a re-exchange unit 229 in addition to the input unit 221, the input buffer 222, the color converting unit 223, the intermediate buffer 224, the attribute obtaining unit 225 and the reconversion unit 226 which are described in the first embodiment.

The pixel exchange unit 227 functions as an exchange section which exchanges, of the image data of the predetermined number of rows, the pixels of the different rows of the image data before the color conversion sections (e.g., the four color converting units 223a, 223b, 223c and 223d) perform color conversion.

More specifically, as shown in FIG. 6, the pixel exchange unit 227 performs exchange to exchange, of the eight pixels written into the input buffer 222, the color of the pixel (e.g., m12) of the row for the color converting unit 223a with the color of the pixel (e.g., m31) of the row for the color converting unit 223c.

The exchange by the pixel exchange unit 227 is performed before color conversion, so that the exchanged two pixels are respectively color-converted by the color conversion sections which are for the rows of the exchanged pixels. Hence, as shown in FIG. 6, the pixel "m31" which is, before exchange, the pixel of the row for the color converting unit 223c is color-converted by the color converting unit 223a using the first color conversion table, whereby the "n31" is obtained, whereas the pixel "m12" which is, before exchange, the pixel of the row for the color converting unit 223a is color-converted by the color converting unit 223c using the second color conversion table, whereby the "n12" is obtained. Thus, of the image data of different rows, the pixels of which are exchanged by the pixel exchange unit 227, the image data of one row (e.g., m31) is color-converted with the first color conversion table, whereas the image data of the other row (e.g., m12) is color-converted with the second color conversion table.

In the second embodiment, the input buffer 222 is provided to store image data of two of a pixels×b pixels for the pixel exchange unit 227 to perform exchange before the input buffer 222 provides the data to the color converting unit 223. In this case, the pixel exchange unit 227 performs exchange, of the image data of two of a pixels×b pixels stored in the input buffer, on the image data of one of a pixels×b pixels which is input earlier, and at the same timing as the exchange, the input unit 221 writes image data of another one of a pixels×b pixels into the input buffer. This configuration of the input buffer 222 is not a limitation but an example. Hence, for example, FIFO may be adopted to configure the input buffer.

Further, in the second embodiment, the attribute obtaining unit 225 obtains the attribute information on each of the pixels contained in the pixel area of a pixels×b pixels read by the pixel exchange unit 227.

The exchange information storage unit 228 stores a correspondence between the pixels exchanged by the pixel exchange unit 227. More specifically, the exchange information storage unit 228 includes a not-shown register and stores therein information indicating the pixels exchanged by the pixel exchange unit 227.

The exchange information storage unit 228 is detailed as the one having the above-described configuration. However, in the case where the correspondence between the positions of the pixels exchanged by the pixel exchange unit 227 and the positions of the pixels input into the re-exchange unit 229 is managed in advance, for example, in the case where specific pixel positions (the pixels "m12" and "m31" in the above) in the predetermined pixel area are always determined and act as exchange target positions, the re-exchange unit 229 can perform exchange without referring to the information in the exchange information storage unit 228.

The re-exchange unit 229 functions as a re-exchange section which re-exchanges the pixels having the colors exchanged by the pixel exchange unit 227 according to the correspondence stored in the exchange information storage unit 228 after the color converting sections (e.g., the four color converting units 223a, 223b, 223c and 223d) perform color conversion but before the reconversion unit 226 performs reconversion.

More specifically, the re-exchange unit 229 performs re-exchange to return two pixels correlated by the correspondence stored in the exchange information storage unit 228, namely, color-converted pixels corresponding to the two pixels exchanged by the pixel exchange unit 227, to the positions corresponding to the positions before exchange by the pixel exchange unit 227. The two pixels to re-exchange are color-converted pixels. Therefore, for example, in the case where the pixels exchanged by exchange are the pixels "m31" and "m12", the pixels to re-exchange are, as shown in FIG. 6, the pixels "n31" and "n12" which are obtained by color conversion on the pixels "m31" and "m12". In this case, through re-exchange, the pixel "n31" returns to the position corresponding to the row for the color converting unit 223c, and the pixel "n12" returns to the position corresponding to the row for the color converting unit 223a.

Further, the re-exchange unit 229 is provided, for example, between the intermediate buffer 224 and the reconversion unit 226, and reads the color-converted pixel area of a pixels×b pixels from the intermediate buffer 224, performs re-exchange on the read pixel area, and sends the re-exchanged pixel area of a pixels×b pixels to the reconversion unit 226. That is, in the second embodiment, the reconversion unit 226 performs processing on each of the pixels contained in the image data corresponding to the pixel area of a pixels×b pixels re-exchanged by the re-exchange unit 229.

In the second embodiment, when the attribute information of the "image (I)" is set in all the pixels contained in the predetermined pixel area (a pixel area of e pixels×f pixels) which is different from that of the first embodiment, the reconversion unit 226 replaces, of the pixels contained in the predetermined pixel area, the pixels color-converted with the second color conversion table by the pixel color-converted with the first color conversion table in the predetermined pixel area.

In the case shown in FIG. 6, the attribute information of the "image (I)" is set in all the four pixels (m31, m41, m32, m42) contained in the pixel area of (e, f)=(2, 2). In this case, the reconversion unit 226 performs replacement to replace the pixels (n41, n32, n42) color-converted with the second color conversion table by the pixel (n31) color-converted by the color converting unit 223a using the first color conversion table. Thus, through reconversion by the reconversion unit 226, the colors of all the four pixels (m31, m41, m32, m42) become the color of the pixel (n31) color-converted with the first color conversion table.

Further, in the second embodiment, when the attribute information of the "edge (E)" is set in one or more pixels contained in the predetermined pixel area (the pixel area of e pixels×f pixels) which is different from that of the first embodiment, the reconversion unit 226 does not perform reconversion on the predetermined pixel area.

In the case shown in FIG. 6, the attribute information of the "image (I)" is set in two pixels (m11, m12) of the four pixels (m11, m21, m12, m22) contained in the pixel area of (e, f)=(2, 2). In this case, the reconversion unit 226 does not perform reconversion on the pixel area. Hence, the colors of the four pixels (m11, m21, m12, m22) are the colors of the pixels (n11, n21, n12, n22) color-converted by the color converting units 223a, 223b, 223c and 223d, respectively.

In other words, the reconversion unit 226 of the second embodiment performs the same processing as the reconversion unit 226 of the first embodiment, except that the predetermined pixel area as a batch for reconversion is different therebetween.

As described above, according to the image forming device of the second embodiment, of the image data of different rows, the pixels of which are exchanged by the pixel exchange unit 227, the image data of one row is color-converted with certain color conversion information (e.g., the first color conversion table), and the image data of the other row is color-converted with other color conversion information (e.g., the second color conversion table). Consequently, the pixel to be color-converted with the other color conversion information unless exchange is performed can be color-converted with the certain color conversion information. Further, the re-exchange unit 229 re-exchanges the pixels having the colors exchanged by the pixel exchange unit 227. Consequently, the color of the pixel color-converted by a color conversion section (e.g., the color converting unit 223a) using the certain color conversion information is applicable to the row(s) for another color conversion section(s) (e.g., the color converting unit 223c) which performs color conversion using the other color conversion information. Thus, according to the image forming device of the second embodiment, the result of color conversion with the certain color conversion information is applicable to a plurality of rows. Consequently, the result of the certain color conversion is more uniformly applicable to the entire pixel area contained in the image data, and more optimum color conversion can be two-dimensionally performed on the image data.

For example, through reconversion in the first embodiment, the colors of the pixels (e.g., m11, m21, m31, m41) of one column extending four rows become the same color, so that the resolution of the image in the Y direction becomes ¼ as compared with before reconversion. Meanwhile, in the second embodiment, the resolution in the vertical direction can be ½ as compared with before reconversion. For example, when the resolution of image data before color conversion is 1200 dpi×1200 dpi, the resolution of the reconverted predetermined pixel area is 1200 dpi×300 dpi in the first embodiment, whereas the resolution of the reconverted predetermined pixel area is 600 dpi×600 dpi in the second embodiment. Thus, a reconversion result vertically and horizontally more uniform can be obtained in the second embodiment. In each of the first and second embodiments, the resolution of the predetermined pixel area containing the pixel(s) where the attribute information of the "edge (E)" is set is 1200 dpi×1200 dpi. Thus, the original resolution can be maintained without decrease.

The embodiments of the present invention, namely, the embodiments described herein, are examples in every aspect and hence should not be regarded as limitations. The scope of the present invention is shown by not the above descriptions but the scope of claims and is intended to include equivalents to the scope of claims and all modifications made within the scope thereof.

For example, the pixel exchange unit 227 of the second embodiment may determine pixels to exchange their colors on the basis of the attribute information on each of pixels contained in a unit area, the pixels being contained in the image data of the predetermined number of rows (e.g., the image data corresponding to the pixel area of a pixels×b pixels).

Figure 7:
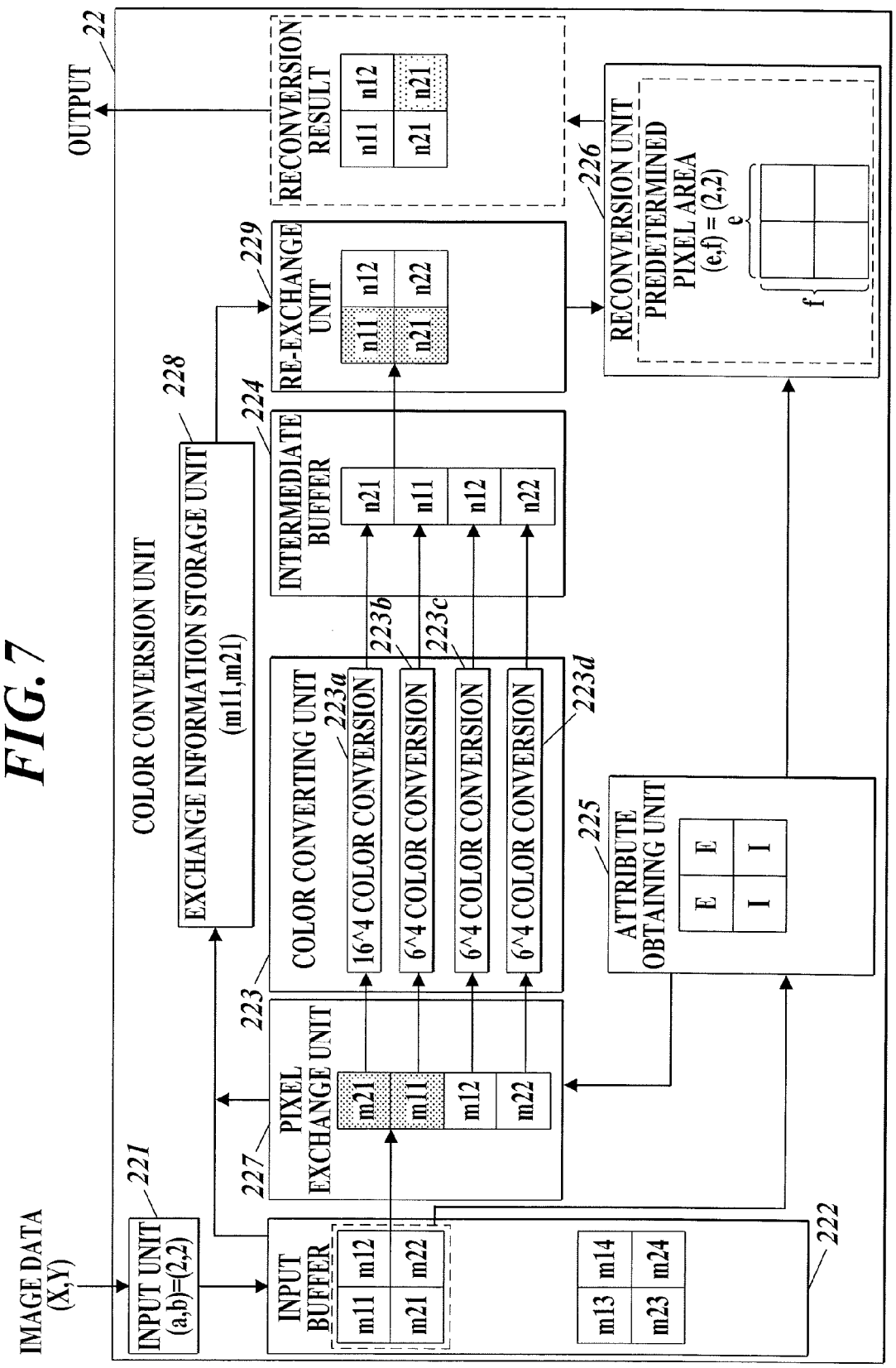
FIG. 7 shows an example of the case where color conversion is performed in parallel on four pixels contained in a unit area of (a, b)=(2, 2) by four color converting units.

More specifically, for example, as shown in FIG. 7, the pixel exchange unit 227 takes a pixel area containing image data of two rows written into the input buffer 222 as the unit area and determines pixels to exchange their colors on the basis of the attribute information on each of the pixels contained in the unit area.

FIG. 7 shows an example of the case where the four color converting units 223a, 223b, 223c and 223d perform color conversion in parallel on four pixels (m11, m21, m12, m22) contained in a unit area of (a, b)=(2, 2). The four color converting units 223a, 223b, 223c and 223d perform color conversion on the upper left, the lower left, the upper right and the lower right in the unit area, respectively.

If the pixel exchange unit 227 does not exchange pixels, the color converting unit 223a performs color conversion (16^4 color conversion) on the pixel "m11" at the upper left in the unit area shown in FIG. 7. The attribute information set in the pixel "m11" is the attribute information of the "edge (E)". Meanwhile, in the unit area, there are pixels where the attribute information of the "image (I)" is set, such as the "m21" and the "m22". In this case, the pixel exchange unit 227 obtains the attribute information on each of the pixels in the unit area from the attribute obtaining unit 225 and exchange pixels in such a way that the color converting unit 223a performs color conversion on a pixel where the attribute information of the "image (I)" is set. More specifically, the pixel exchange unit 227 exchanges, for example, the pixel "m11" with the pixel "m21".

Further, when a positional relationship of pixels where the attribute information of the "edge (E)" is set and pixels where the attribute information of the "image (I)" is set in a unit area is a specific positional relationship, the reconversion unit 226 performs reconversion on a predetermined pixel area even when the attribute information of the "edge (E)" is set in one or more pixels contained in the predetermined pixel area.

More specifically, when pixels where the attribute information of the "image (I)" is set are adjacent to one another in the row direction or the column direction, the reconversion unit 226 performs reconversion. In the case shown in FIG. 7, the pixels "m21" and "m22" where the attribute information of the "image (I)" is set are adjacent to each other in the row direction. In this case, the reconversion unit 226 replaces the pixel "m22" by the pixel "m21" color-converted by the color converting unit 223a. Consequently, the accuracy of color conversion by the color conversion unit 22 can be further increased.

The pixel exchange in the unit area and the reconversion shown in FIG. 7 are not limitations but examples. Other examples are described with reference to FIG. 8.

FIG. 8 shows combination patterns of types of attribute information set in pixels contained in a unit area, and so forth in the case where a pixel area containing image data of two rows color-converted by two color converting units 223c and 223d which perform color conversion using the second color conversion table is the unit area.

For example, when the attribute information on a pixel at a predetermined position is not the attribute information of the "image (I)", pixel exchange may be performed. More specifically, when, as shown in patterns P2, P7, P9, P10 and P12 to P14 in FIG. 8, the attribute information set in a pixel at a predetermined position (e.g., the pixel "m11" at the upper left in the unit area shown in FIG. 7) to be color-converted with the color conversion information having a larger information amount (e.g., 16^4 color conversion) unless pixel exchange is performed is not the attribute information of the "image (I)", but the attribute information of the "image (I)" is set in any of the other pixels in the unit area, the pixel exchange unit 227 may take one of the pixels where the attribute information of the "image (I)" is set as an exchange target pixel and exchanges the pixel at the predetermined position with this pixel.

Further, when the attribute information set in the pixel at the predetermined position is the attribute information of the "image (I)" as shown in patterns P3 to P6, P8, P11 and P15 in FIG. 8, the pixel exchange unit 227 may perform no pixel exchange or may exchange the pixel at the predetermined position with any one of the pixels where the attribute information of the "image (I)" is set. Further, when the attribute information of the "image (I) is set in all the pixels as shown in a pattern P1 in FIG. 8, or when there is no pixel where the attribute information of the "image (I)" is set in the unit area as shown in a pattern P16 in FIG. 8, the pixel exchange unit 227 may perform no pixel exchange.

Thus, on the basis of the attribute information on each of the pixels contained in the unit area, the pixels being contained in the image data of the predetermined number of rows (e.g., the pixel area containing image data of two rows written into the input buffer 222), the color-exchange target pixel is determined. Thereby, on the basis of the attribute information, a pixel which is more desired to be color-converted with the certain color conversion information (e.g., a certain color conversion table) can be made to be the color-exchange target pixel. Consequently, the accuracy of color conversion can be further increased.

Further, the reconversion unit 226 may determine whether to perform reconversion on the basis of the positional relationship of pixels where the attribute information of the "image (I)" is set and pixels where the attribute information of the "edge (E)" is set in a unit area.

More specifically, for example, when, in the same unit area as above (see FIG. 8), two or more pixels where the attribute information of the "image (I)" is set are adjacent to one another, the reconversion unit 226 may replace, by the one pixel color-converted with the first color conversion table of the two or more pixels where the attribute information of the "image (I)" is set, the other pixel (s) where the attribute information of the "image (I)" is set.

For example, in the case of, of the patterns shown in FIG. 8, the patterns (patterns P1 to P15) containing the pixel(s) where the attribute information of the "image (I)" is set, the color converting unit 223a performs, using the first color conversion table, color conversion on one pixel of the pixels where the attribute information of the "image (I)" is set after the pixel exchange unit 227 performs exchange.

When, as shown in the pattern P1, all the four pixels in the unit area are the pixels where the attribute information of the "image (I)" is set, it is assumed that the pixel area in the unit area is a pixel area contained in a natural image which is not divided by a contour or the like and is a continuous pixel area where pixels having the same color or similar colors are arranged. In this case, the reconversion unit 226 replaces, by the one pixel color-converted by the color converting unit 223a using the first color conversion table, the other three pixels.

Further, when, as shown in the patterns P2 to P5, there are three pixels where the attribute information of the "image (I)" is set in the unit area, as with the pattern P1, it is assumed that these three pixels are of a pixel area contained in a natural image which is not divided by a contour or the like. In this case, the reconversion unit 226 replaces, by the one pixel color-converted by the color converting unit 223a using the first color conversion table, the other two pixels.

Further, when, as shown in the patterns P8 to P11, there are two pixels where the attribute information of the "image (I)" is set and two pixels where the attribute information of the "edge (E)" is set in the unit area, and the two pixels where the attribute information of the "image (I)" is set are adjacent to each other in the X direction or the Y direction, as with the patterns P1 to P5, it is assumed that these two pixels are of a pixel area contained in a natural image which is not divided by a contour or the like. In this case, the reconversion unit 226 replaces, by the one pixel color-converted by the color converting unit 223a using the first color conversion table, the other one pixel.

On the other hand, when, as shown in the patterns P6 and P7, there are two pixels where the attribute information of the "image (I)" is set and two pixels where the attribute information of the "edge (E)" is set in the unit area, and the two pixels where the attribute information of the "image (I)" is set are not adjacent to each other in either the X direction or the Y direction, it is assumed that these two pixels are of a pixel area which is divided by a contour or the like. Hence, it is possible that these two pixels where the attribute information of the "image (I)" is set are completely different from each other in color. In this case, the reconversion unit 226 does not perform reconversion and leaves the colors obtained by color conversion performed on the pixels as they are.

Further, when, as shown in the patterns P12 to P15, there is one pixel where the attribute information of the "image (I)" is set in the unit area, the color converting unit 223a performs color conversion on this one pixel using the first color conversion table, but there is no other pixel (pixel where the attribute information of the "image (I)" is set) to be replaced by this one pixel. In this case, the reconversion unit 226 does not perform reconversion and leaves the colors obtained by color conversion performed on the pixels as they are.

Further, when, as shown in the pattern P16, there is no pixel where the attribute information of the "image (I)" is set in the unit area, the consideration to be given to the pixels where the attribute information of the "image (I)" is set and for which gradation is more important is unnecessary. In this case, the reconversion unit 226 does not perform reconversion and leaves the colors obtained by color conversion performed on the pixels as they are.

Thus, whether to perform reconversion is determined on the basis of the positional relationship of pixels where the attribute information including the edge information (e.g., the attribute information of the "edge (E)") is set and pixels where the attribute information including the natural image information (e.g., the attribute information of the "image (I)") is set in a unit area. Thereby, whether to perform reconversion can be determined in consideration of whether pixels where the attribute information including the natural image information is set continuously exist in a unit area. Consequently, the accuracy of color conversion by the color conversion unit 22 can be further increased.

When the systems to determine the exchange target pixel, to determine whether to perform reconversion, and so forth described with reference to FIG. 8 are adopted, these systems are pre-incorporated as routines of the processing performed by the color conversion unit 22.

The cases shown in FIGS. 7 and 8 are not limitations but examples. Hence, for example, in the cases shown in FIGS. 7 and 8, the attribute information on the image data of two rows color-converted by the color converting units 223c and 223d in the first and second embodiments is not used for pixel exchange. However, the exchange target pixel and/or whether to perform reconversion may be determined in consideration of the attribute information on the image data of these two rows too.

Further, when, as shown in the patterns P2 to P5 in FIG. 8, the attribute information of the "image (I)" is set in three pixels adjacent to one another in the unit area, the pixel having the largest number of adjacent pixels where the attribute information of the "image (I)" is set may be taken as the exchange target pixel. That is, in the case of the patterns P2 to P5 in FIG. 8, of the three pixels where the attribute information of the "image (I)" is set and which are continuously arranged in such a way as to draw the letter "L", the pixel at the corner of the letter "L" may be taken as the exchange target pixel. In this case, of the pixels which constitute a natural image, by the color of the pixel closest to the center thereof, the other pixel (s) can be replaced. Consequently, the colors before and after replacement by the reconversion unit 226 can be made more similar to each other, and the accuracy of color conversion can be further increased.

Besides, in the above embodiments, the first color conversion table contains the entire pattern information contained in the second color conversion table. However, this is not a limitation but an example. Hence, for example, of the pieces of pattern information contained in the second color conversion table, there may be some pieces which are not contained in the first color conversion table.

Further, in the above embodiments, as different types of color conversion information, multiple types of color conversion information different in the information amount are used. However, this is not a limitation but an example. Hence, for example, multiple types of color conversion information corresponding to multiple color reproduction characteristics (a gradation-focused color conversion characteristic suitable for reproduction of a natural image, a color reproduction characteristic suitable for reproduction of a character, etc., to be specific) and being different in the information amount may be used. In this case, the color conversion information having a smaller information amount is used as the other color conversion information.

Further, the types of color conversion information used by the color conversion sections may correspond to the types of attribute information on pixels. For example, there may be used: color conversion information for color conversion on pixels where the attribute information including the natural image information is set; and color conversion information for color conversion on pixels where the attribute information including the edge information is set. In this case, for example, of the color conversion sections, at least one color conversion section (e.g., the color converting unit 223a) may use the color conversion information for color conversion on pixels where the attribute information including the natural image information is set, and the other color conversion section(s) (e.g., the color converting units 223b, 223c and 223d) may use the color conversion information for color conversion on pixels where the attribute information including the edge information is set. Further, pixel exchange may be performed in such a way that the at least one color conversion section performs color conversion on a pixel(s) where the attribute information including the natural image information is set.

Further, instead of the attribute information including the edge information (e.g., the attribute information of the "edge (E)"), the attribute information including character information (e.g., attribute information of a "character (C)") indicating a pixel(s) which constitutes a character image may be used. Alternatively, the edge information and the character information may coexist in one embodiment. In this case, for example, of the color conversion sections, at least one color conversion section (e.g., the color converting unit 223a) may use the color conversion information for color conversion on pixels where the attribute information including the natural image information is set, a color conversion section(s) (e.g., the color converting unit 223b) different from the at least one color conversion section may use the color conversion information for color conversion on pixels where the attribute information including the edge information is set, and the other color conversion section(s) (e.g., the color converting units 223c and 223d) may use the color conversion information for color conversion on pixels where the attribute information including the character information is set. Further, pixel exchange may be performed in such a way that the at least one color conversion section performs color conversion on pixels where the attribute information including the natural image information is set, the color conversion section(s) different from the at least one color conversion unit performs color conversion on pixels where the attribute information including the edge information is set, and the other color conversion section(s) performs color conversion on pixels where the attribute information including the character information is set.

Further, the color conversion sections may use color conversion information to determine the discharge amount of ink in image formation. More specifically, for example, there may be used color conversion information created in consideration of the limits of the discharge amount of ink set to control absorbability of ink discharged on recording media, curing time of the ink, thickness of an ink layer formed on the recording media by discharging the ink thereon, and so forth.

Further, the various details described in the above embodiments are examples and can be appropriately modified.

For example, the specific values of the (a, b), (c, d) and (e, f) in the embodiments can also be appropriately modified. Similarly, the various detailed contents, such as the number of color conversion sections, the total number of types of color conversion information used by the color conversion sections, the number of pieces of pattern information which each of the color conversion sections has, the number of colors and the color space used in image formation, and the specific system for image formation by the image forming unit 30, can be appropriately modified without departing from the scope of the features of the present invention.

INDUSTRIAL APPLICABILITY

The present invention is applicable to a color conversion device and an image forming device each of which performs color conversion of images performed in image formation.

EXPLANATION OF REFERENCE NUMERALS

1 Image Forming Device
10 Control Unit (Image Obtaining Section)
20 Image Processing Unit
22 Color Conversion Unit (Color Conversion Device)
30 Image Forming Unit (Image Forming Section)
221 Input Unit (Input Section)
222 Input Buffer
223, 223a, 223b, 223c, 223d Color Converting Unit (Color Conversion Section)
224 Intermediate Buffer
225 Attribute Obtaining Unit (Obtaining Section)
226 Reconversion Unit (Reconversion Section)
227 Pixel Exchange Unit (Exchange Section)
229 Re-exchange Unit (Re-exchange Section)

The invention claimed is:

1. A color conversion device comprising:
an input section which inputs image data of a predetermined number of rows, the predetermined number being two or more;
a plurality of color conversion sections which perform color conversion in parallel to convert colors of pixels contained in the image data of the predetermined number of rows;
an obtaining section which obtains attribute information set in each of the pixels constituting the image data of the predetermined number of rows, the attribute information indicating an attribute of each of the pixels; and
a reconversion section which performs, on the basis of the attribute information, reconversion to reconvert a pixel contained in the image data of the predetermined number of rows color-converted by the color conversion sections, wherein
each of the color conversion sections performs the color conversion using color conversion information including information on a correspondence between colors of pixels before color conversion and colors of the pixels after the color conversion,
of the color conversion sections, at least one color conversion section performs the color conversion using certain color conversion information, and the other color conversion section performs the color conversion using other color conversion information having an information amount less than an information amount of the certain color conversion information, and
when the attribute information is a predetermined attribute information, the reconversion section converts, using a pixel color-converted with the certain color conversion information in a predetermined pixel area contained in the image data of the predetermined number of rows, a pixel color-converted with the other color conversion information in the predetermined pixel area.

2. The color conversion device according to claim 1, wherein
the attribute information includes natural image information which indicates a pixel constituting a natural image, and
when the attribute information including the natural image information is set as the predetermined attribute information in all the pixels contained in the predetermined pixel area, the reconversion section replaces, by the pixel color-converted with the certain color conversion information, the pixel color-converted with the other color conversion information.

3. The color conversion device according to claim 1 further comprising:
an exchange section which exchanges pixels contained in the image data of the predetermined number of rows before the color conversion sections perform the color conversion; and
a re-exchange section which re-exchanges the pixels having colors exchanged by the exchange section according to a correspondence between the pixels having the colors exchanged by the exchange section after the color conversion sections perform the color conversion but before the reconversion section performs the reconversion, wherein of the pixels exchanged by the exchange section, one pixel is color-converted with the certain color conversion information, and the other pixel is color-converted with the other color conversion information.

4. The color conversion device according to claim 3, wherein the exchange section determines the pixels to exchange on the basis of the attribute information on each of pixels contained in a unit area, the pixels being contained in the image data of the predetermined number of rows.

5. The color conversion device according to claim 1, wherein
the attribute information includes either edge information which indicates a pixel constituting an image contour or character information which indicates a pixel constituting a character image, and
when the attribute information including the edge information or the character information is set in one or more pixels contained in the predetermined pixel area, the reconversion section does not perform the reconversion on the predetermined pixel area.

6. The color conversion device according to claim 1, wherein
the attribute information includes: at least one of edge information which indicates a pixel constituting an image contour and character information which indicates a pixel constituting a character image; and natural image information which indicates a pixel constituting a natural image, and even when the attribute information including the edge information or the character information is set in one or more pixels contained in the predetermined pixel area, the reconversion section performs the reconversion on the predetermined pixel area when a positional relationship between a first pixel, where the attribute information including the edge information or the character information is set, and a second pixel, where the attribute information including the natural image information is set, is a predetermined positional relationship.

7. The color conversion device according to claim 1, wherein the other color conversion information is a portion of the correspondence between colors of pixels before color conversion and colors of the pixels after the color conversion, the correspondence being contained in the certain color conversion information.

8. The color conversion device according to claim 1, wherein the color conversion sections perform the color conversion in parallel on rows to convert the colors of the pixels contained in the rows of the image data of the predetermined number of rows.

9. An image forming device comprising:
an image obtaining section which obtains image data;
the color conversion device according to claim 1 which converts colors of pixels contained in the image data obtained by the image obtaining section; and
an image forming section which forms an image on the basis of the image data constituted of the pixels having the colors converted by the color conversion device.

10. A color conversion method of a color conversion device comprising:
an input step of inputting image data of a predetermined number of rows into an input section, the predetermined number being two or more;
a color conversion step of performing color conversion in parallel at a plurality of color conversion sections to convert colors of pixels contained in the image data of the predetermined number of rows;
an obtaining step of obtaining attribute information set in each of the pixels constituting the image data of the predetermined number of rows at an obtaining section, the attribute information indicating an attribute of each of the pixels; and
a reconversion step of performing, on the basis of the attribute information, reconversion to reconvert a pixel contained in the image data of the predetermined number of rows color-converted in the color conversion step at a reconversion section, wherein
in the color conversion step, the color conversion is performed using color conversion information including information on a correspondence between colors of pixels before color conversion and colors of the pixels after the color conversion,
of the color conversion performed in parallel in the color conversion step, at least one color conversion is performed using certain color conversion information, and the other color conversion is performed using other color conversion information having an information amount less than an information amount of the certain color conversion information, and
in the reconversion step, when the attribute information is a predetermined attribute information, using a pixel color-converted with the certain color conversion information in a predetermined pixel area contained in the image data of the predetermined number of rows, a pixel color-converted with the other color conversion information in the predetermined pixel area is converted.

* * * * *